(12) United States Patent
Knapp (10) Patent No.: US 6,609,689 B1
(45) Date of Patent: Aug. 26, 2003

(54) WALL MOUNTABLE ASSEMBLY (75) Inventor: David Knapp, Toronto (CA)

(73) Assignee: Nystrom Group Inc., Toronto (CA)

( * ) Notice: Subject to any disclaimer, the term of this patent is extended or adjusted under 35 U.S.C. 154(b) by 0 days.

(21) Appl. No.: 10/140,985

(22) Filed: May 9, 2002

(51) Int. Cl.$^7$ ............................................. A45D 42/14
(52) U.S. Cl. .................. 248/205.5; 248/205.8; 248/206.2; 248/537
(58) Field of Search ............... 248/309.1, 309.3, 248/205.5, 205.6, 205.8, 206.2, 363, 537; 403/119, 120, 83, 84, 329, 282

(56) References Cited

U.S. PATENT DOCUMENTS

| | | | | |
|---|---|---|---|---|
| 816,588 | A | * | 4/1906 | Moore |
| 2,275,299 | A | * | 3/1942 | Hummert ................... 240/52.2 |
| 2,400,451 | A | * | 5/1946 | Wilson ........................ 306/18 |
| 3,750,991 | A | * | 8/1973 | Ragir ..................... 248/206 R |
| 4,813,640 | A | * | 3/1989 | Perentin .................. 248/205.8 |
| 5,025,919 | A | * | 6/1991 | Brinker et al. .............. 206/214 |
| 5,029,786 | A | * | 7/1991 | Wu ......................... 248/205.7 |
| 5,176,347 | A | * | 1/1993 | Rouail ..................... 248/206.2 |
| 5,176,357 | A | * | 1/1993 | Hobart ........................ 248/683 |
| 5,779,205 | A | * | 7/1998 | Ching ..................... 248/205.8 |
| 5,996,950 | A | * | 12/1999 | Richter .................... 248/205.5 |
| 6,244,778 | B1 | * | 6/2001 | Chesbrough ................. 403/51 |
| 6,402,104 | B1 | * | 6/2002 | Smith ...................... 248/205.5 |

* cited by examiner

*Primary Examiner*—Anita King
*Assistant Examiner*—Steven Marsh (57) ABSTRACT

A wall mountable assembly such as a wall mountable towel ring or the like includes a base part and an object support part extending from the base part. The base part is formed from a wall attachment member and a cover member which fits over the wall attachment member. The wall attachment member has an arm which extends through the cover member and which secures by a pivot connection to a cam member at the inner end of the object support part of the assembly. The object support part is swingable from a non-use to a use position relative to the base part to cause the cam member to move between a loose and a tight fitting with respect to the cover of the base part. The assembly further includes a locking member which releasably secures to the cam member and which blocks the cam member from moving away from the tight fitting holding all of the components of the assembly tightly secured to one another.

8 Claims, 9 Drawing Sheets

WALL MOUNTABLE ASSEMBLY

FIELD OF THE INVENTION

The present invention relates to a wall mountable assembly which includes an object support part extending from a base part that secures to a wall of a room. The object support part is preferably some type of a bathroom or kitchen accessory such as a towel bar, towel ring, soap dish etc.

BACKGROUND OF THE INVENTION

Wall mountable kitchen and bathroom accessories such as towel bars, towel rings, soap dishes, paper tissue holders, robe hooks etc. are used in essentially all homes. Typically these accessories have a one-piece rigid construction and are secured to a wall of a room by screws fitted through pre-set openings in the base of the accessory. This method of mounting is relatively simple when fitting the accessory to a wall having a wood or a plaster construction. However, the mounting of the accessory is more difficult when working with a tiled wall surface. The tiles must be drilled to receive the accessory. If the homeowner wishes to remove the accessory from the tile the damage caused by the drilling typically necessitates replacement of the entire piece of tile. This is costly and sometimes not truly effective because it can often be difficult to find an exact match as a replacement tile.

The prior art further includes suction cup mounts for wall hooks. These types of mounts are extremely useful on high gloss surfaces such as those presented by most ceramic tiles. Therefore, a suction cup mount is a very effective way of securing a hook to a ceramic tile. Obviously the hook can be removed and replaced as often as wanted without producing any damage to the mounting surface.

To date however, there is nothing available in the way of a suction cup mount, which will lock against premature release. Furthermore, there is currently nothing available in the way of a suction cup mount, which presents an esthetically appealing appearance for use on high quality wall mounted accessories.

SUMMARY OF THE PRESENT INVENTION

The present invention provides a wall mountable assembly specifically designed for use with high quality kitchen, bathroom and other room accessories with the actual mounting structure of the assembly including covering pieces having both decorative and functional features. Through the use of these covering pieces the assembly can be mounted to a wood or plaster wall using mounting screws which are hidden by the cover pieces. In addition the assembly can be mounted to high luster surfaces such as ceramic tile using a suction cup mount which is locked against inadvertent release by the covering pieces. The covering pieces also hide the suction cup mount.

More specifically, the wall mountable assembly of the present invention comprises a base part and an object support part extending from the base part. The object support part can take many different forms such as for example, a towel ring, a towel bar, a soap dish etc.

The base part comprises a wall attachment member and a cover member which fits over the wall attachment ember. The wall attachment member has an arm which extends through the cover member and which secures by a pivot connection to a cam member at one end of the object support part of the assembly.

In its non-use configuration, the object support parts swings to a position which enables an easy mounting of base part to a supporting wall. After the base part has been fitted to the wall the object support part swings relative to the base part to its in use position. This causes the cam member to move between a loose and a tightened fitting with respect to the cover of the base part. The assembly further includes locking means to releasably lock with the cam member which blocks the cam member from moving away from the tightened fitting. This ensures that the object support part of the assembly stays in its use position.

Preferably the locking means is in the form of a decorative cap which fits over and hides the cam member of the assembly.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
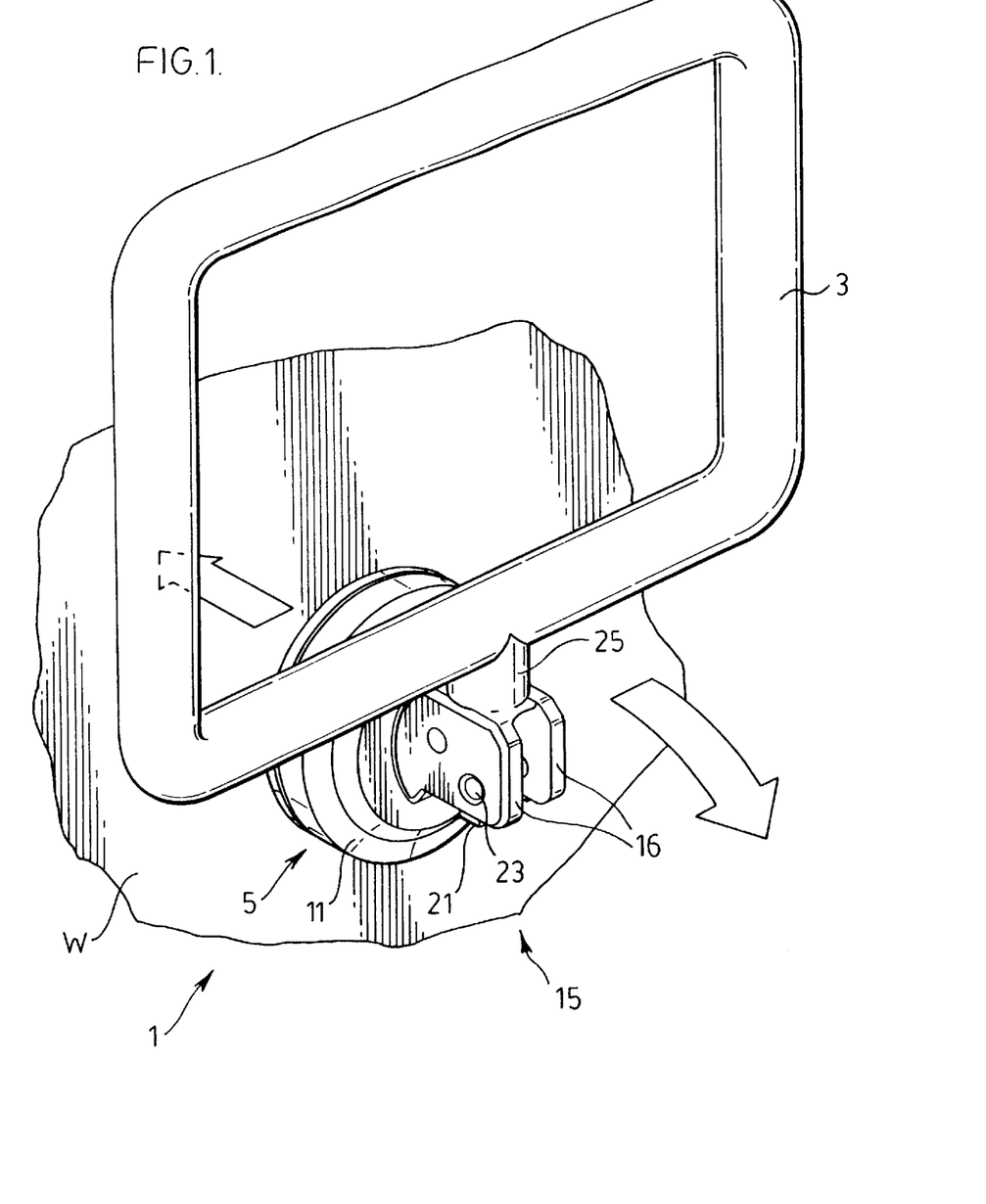
FIG. 1 is a perspective view of a wall mountable towel holder according to a preferred embodiment of the present invention.

FIG. 1 shows a wall mountable assembly generally indicated at 1. This assembly includes an object support part in the form of a towel holder 3 and a base part generally indicated at 5.

Figure 2:
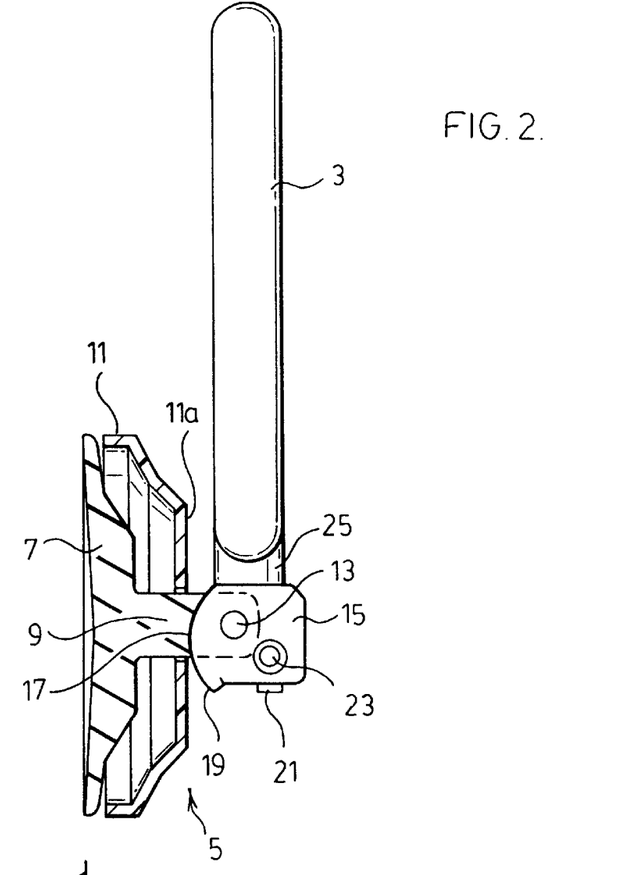
FIG. 2 is a sectional view through the towel holder of FIG. 1.
Figure 3:
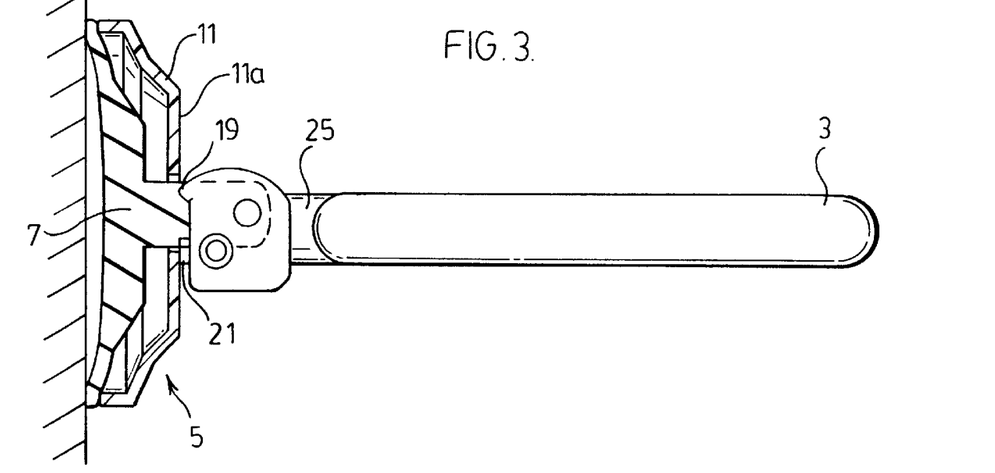
FIG. 3 is a sectional view of the towel holder of FIG. 2 when in its use position.
Figure 4:
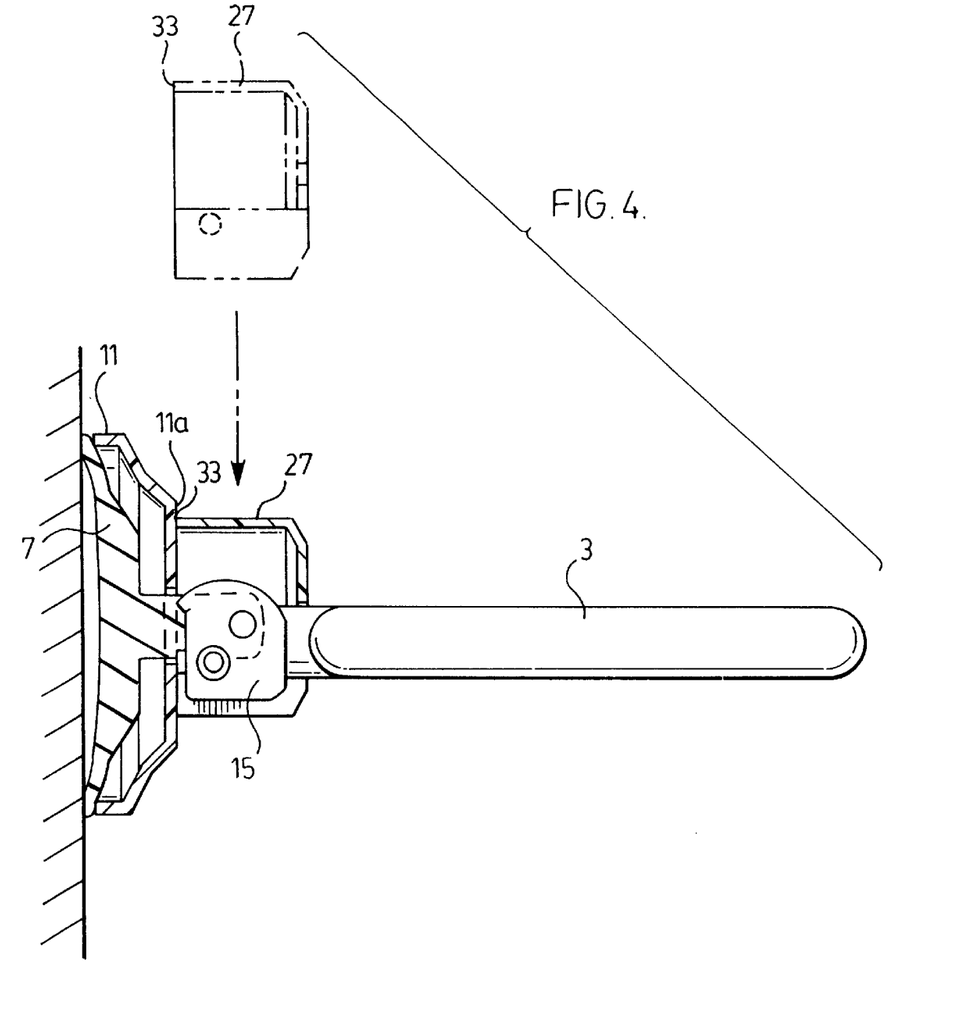
FIG. 4 is a view similar to FIG. 3 showing the insertion of the locking cap to hold the towel holder in its use position.

FIGS. 1 and 2 show the towel holder 3 in a non-use position. FIGS. 3 and 4 show the towel holder after it has been swung to its use position.

Figure 5:
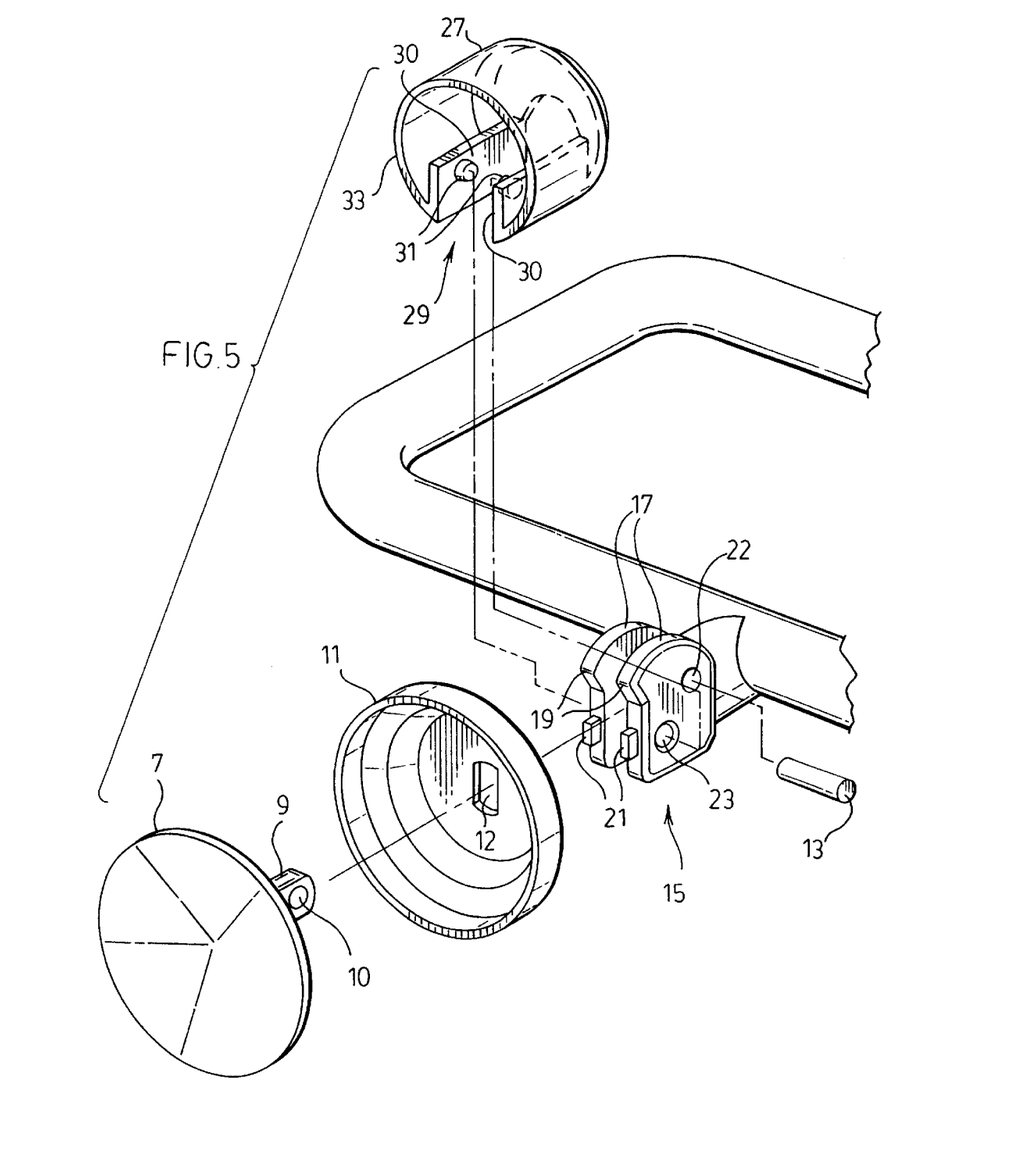
FIG. 5 is an enlarged exploded perspective view of the towel holder of FIG. 4 when seen from the rear.
Figure 6:
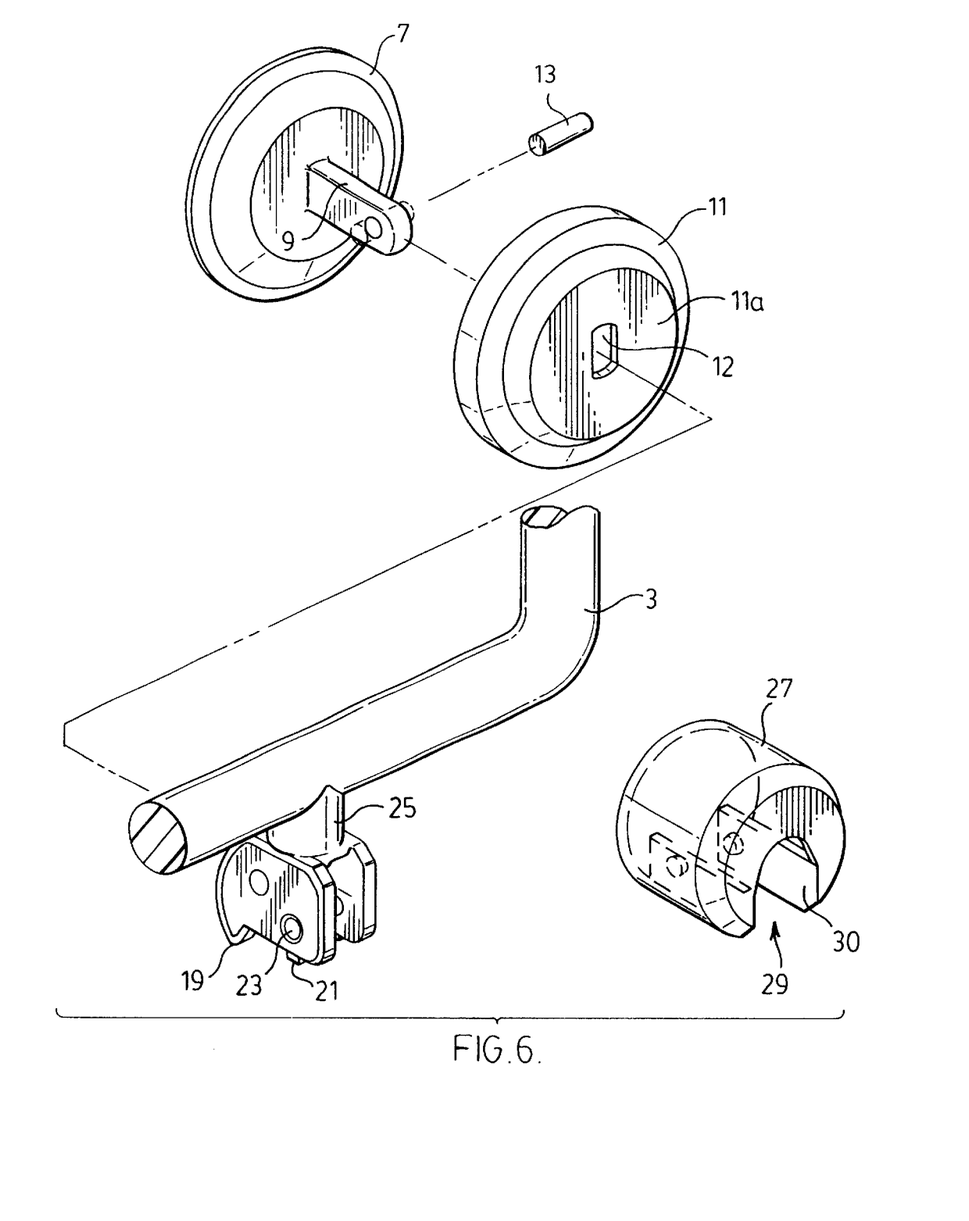
FIG. 6 is a front exploded perspective view of the base part, locking cap and cam member from the towel holder of FIG. 4.

Referring now to FIGS. 5 and 6 the base part of the assembly comprises a wall attachment member 7 and a cover 11 which fits over the wall attachment member. In this particular case the wall attachment member is in the form of a suction cup.

The wall attachment member i.e., suction cup 7 is provided with a forwardly extending arm 9. This arm penetrates through an opening 12 centrally of cover 11.

The arm 9 includes a small opening 10 to receive a pin 13 as best seen in FIG. 6 of the drawings.

FIGS. 5 and 6 show that towel holder 3 includes a short base leg 25 fitted with a cam member 15. Cam member as seen for example in FIG. 1 of the drawings is formed by a pair of spaced apart walls 16 which secure to opposite sides of base leg 25 of towel holder 3.

As shown for example, in FIG. 5 of the drawings each of the walls 16 of the cam member includes a rounded cam surface which terminates with projections 19 to opposite sides of the cam member. Also provided on the cam member are a pair of lugs 21 facing in the same direction as cam projections 19.

The cam member is additionally provided with a small bores 22 through the two walls of the cam member.

In order to assemble the object support part with the base part of the assembly arm 9 is fitted between the two cam walls 16 with the opening 10 in the arm aligning with the bores 22 through the cam member. Pin 13 is then inserted through the aligned bores and opening to provide a pivotal connection between suction cup and cam member 15. The cover 11 is trapped between the suction cup and the cam member.

FIG. 1 shows the assembly ready to mount to a wall surface W. In this case, when working with a suction cup, the wall surface needs to be high gloss in order to hold the suction cup mount. A ceramic tile surface or the like is particularly suitable for receiving the suction cup mount.

The base part and in particular suction cup 7 is pushed against the high gloss surface. While maintaining pressure to push the suction cup against the surface, towel holder 3 is swung through about a 90 degree angle from its FIG. 2 non-use position to its FIG. 3 use position. As the towel bar is swung downwardly rounded surface 17 of the cam which is loosely fitted against the cover rides along the front face 11a of cover 11 until the projections 19 and lugs 21 of the cam member push tightly against the front face of the cover. The swinging of the bar and the interaction of the cam with the cover causes the arm 9 of the suction cup to be pulled in a direction away from the wall. As can be seen in comparing FIG. 3 with FIG. 2, the edges of the suction cup remain engaged with the wall while the center of the suction cup is pulled away from the wall to produce a low pressure vacuum centrally of the suction cup to secure the assembly to the wall.

FIG. 4 of the drawings shows that once the towel holder 3 has been moved to its use position locking means in the form of a decorative cap 27 is used to secure the use position of the towel bar.

FIGS. 5 and 6 of the drawings show further details of locking cap 27. More particularly, the locking cap, like cover 11, has a finished decorative appearance covering most of the locking cap. In addition to that decorative appearance the cap includes a slot 29 having a mouth which opens to the bottom of the cap. The mouth of the slot is defined by a pair of slot walls 30 each of which includes a small projection 31.

As seen in FIG. 5 the cap is completed with a flat back edge 33.

FIG. 4 shows that with towel holder 3 in its forwardly extending use position, the cap 27 is slid downwardly onto cam member 15. The mouth of the cap fits over each of the cam walls 16 to the point where the small projections 30 of the cap snap lock into recesses 23 in each of the cam walls to opposite sides of the cam. Although the cap is made of a relatively rigid plastic, it does have some flexibility which assists in locking the cap with the cam member.

Once the cap is snap locked into position the flat back edge 33 of the cap seats against the flat front face 11a of cover 11. This provides a block which prevents the towel holder from swinging back up to its non-use position as long as the cap is locked on the cam member. When the towel holder is blocked against upward swinging the suction cup is maintained in the FIG. 4 wall adhering position.

The above method of mounting the assembly to the wall is extremely efficient. The limited swinging of the towel holder through only a 90 degree angle produces a very positive interlock of the suction cup with the wall. It furthermore assures that the towel holder extends in the desired horizontal position of FIGS. 3 and 4.

FIGS. 7 through 14 of the drawings show how this same mounting principal can be used with any number of different mountable assemblies. For example, FIG. 7 of the drawings shows an assembly generally indicated at 41. This assembly includes a base part 43 and a product support part in the form of a towel ring 47. The towel ring includes a short base leg 49 which is fitted at its inner end with a cam member that operates in the same manner as that described with respect to FIGS. 1 through 6 of the drawings. A decorative cap 45 is then used to secure the towel ring in its FIG. 7 use position.

Figures 7, 8, 9:
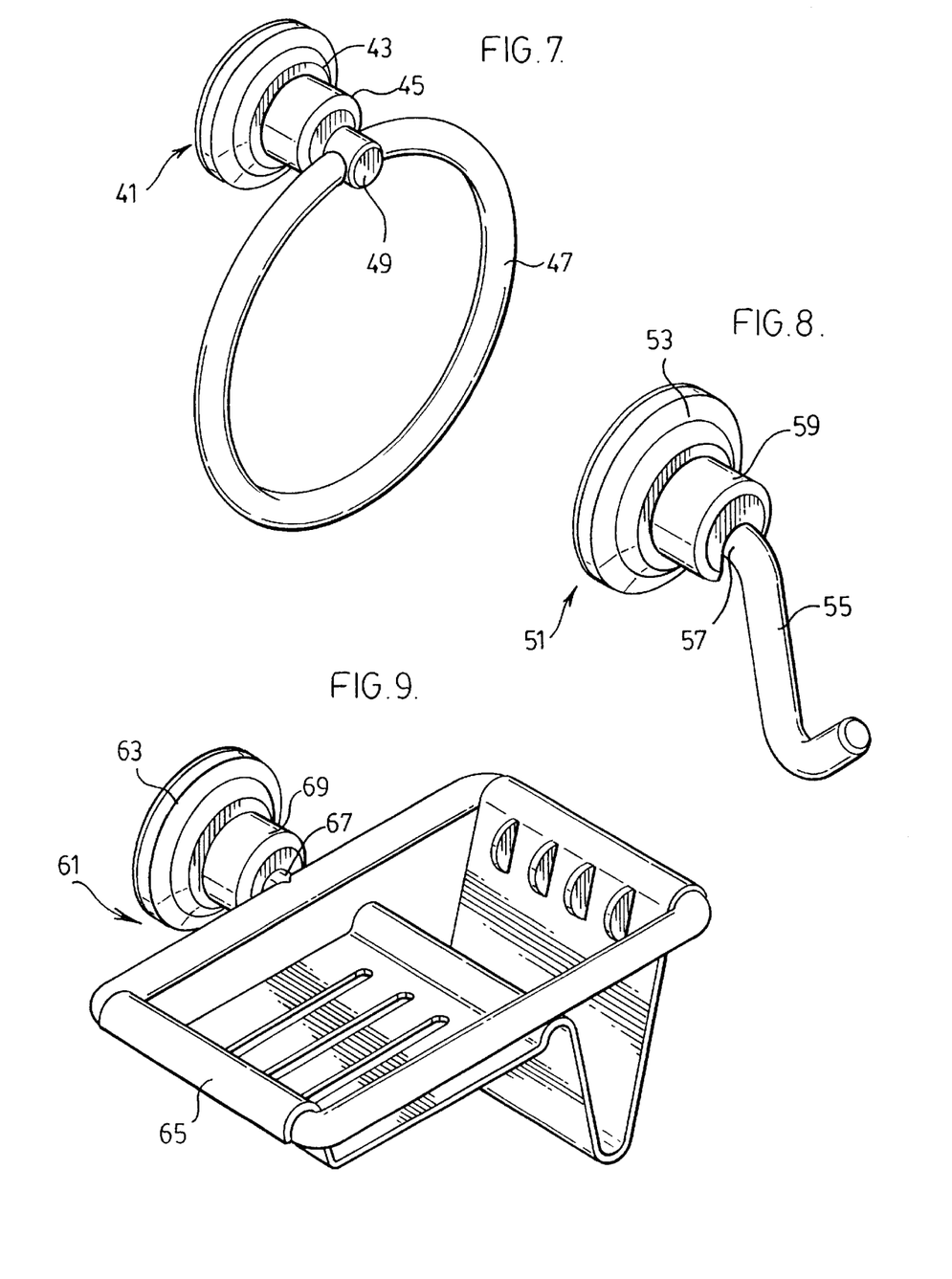
FIGS. 7 through 14 are front perspective views of different wall mountable assemblies according to different preferred embodiments of the present invention.

It is to be noted that even though towel ring 47 hangs vertically from its base leg 49, the base leg itself swings through a 90 degree angle from a vertical position to the horizontal position of FIG. 7 in carrying the towel ring from its non-use to its use position.

FIG. 8 shows a wall mountable assembly 51. This assembly includes a decorative base part 53 which supports an accessory in the form of a hook 55. Hook 55 has a base leg 57 extending horizontally from the base part 53. A cap 59 is used to secure hook 55 in its FIG. 8 use position.

Again, it should be noted that even though the hook 55 is in a downwardly extending position the base leg 57 of the hook has swung from an upright to a horizontal position to carry the hook to its use position.

Figure 10:
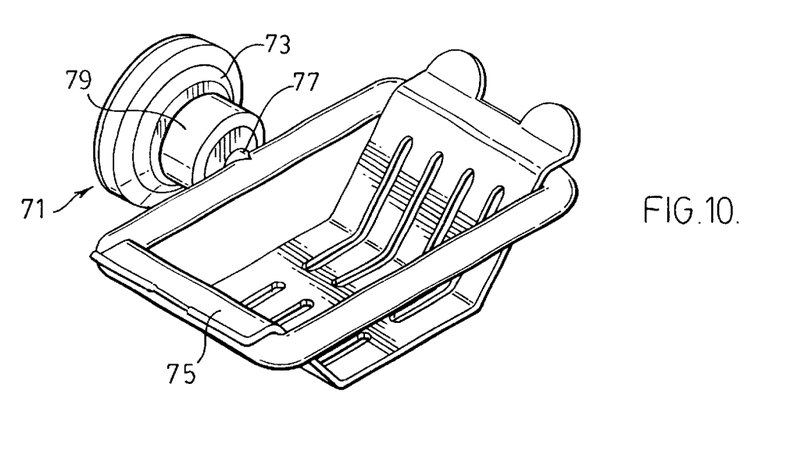

FIG. 9 shows a wall mountable assembly 61. This assembly includes a base part 63 and product support part in the form of a soap dish and item organizer 65. This product support part is secured to the base part through a short leg 67. A decorative cap 69 is used to hold the leg 67 in its horizontal extending position shown in FIG. 9. FIG. 10 shows a wall mountable assembly generally indicated at 71. This assembly includes a base part 73, a product support part in the form of a soap dish 75 having a base leg 77. A decorative cap 79 is used to lock the soap dish in the FIG. 10 use position.

Figures 11, 12:
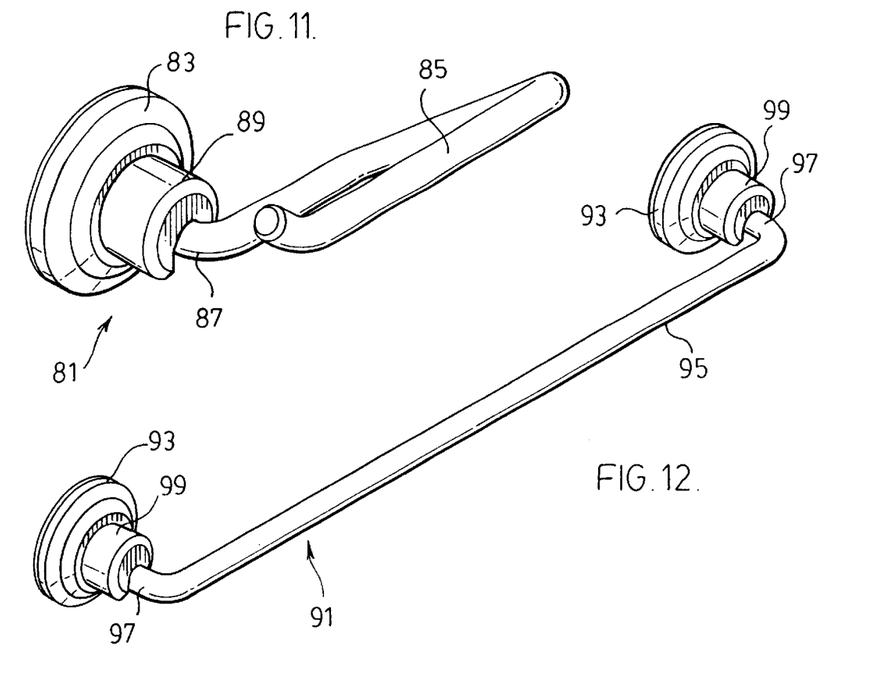

FIG. 11 shows a wall mountable assembly 81. This assembly includes a decorative base part 83 with a product support part in the form of a tissue roll holder 85 extending forwardly from the base part. Roll holder 85 includes a base leg 87 which is locked in its use position by a decorative cap 89.

FIG. 12 of the drawings shows a further wall mountable assembly 91. This assembly includes a pair of decorative base parts 93 for securing a single towel bar 95. This towel bar has base leg 97 to each end of the towel bar. A pair of decorative caps 99 are used at the base parts 93 to secure the towel bar in its FIG. 12 use position.

Figure 13:
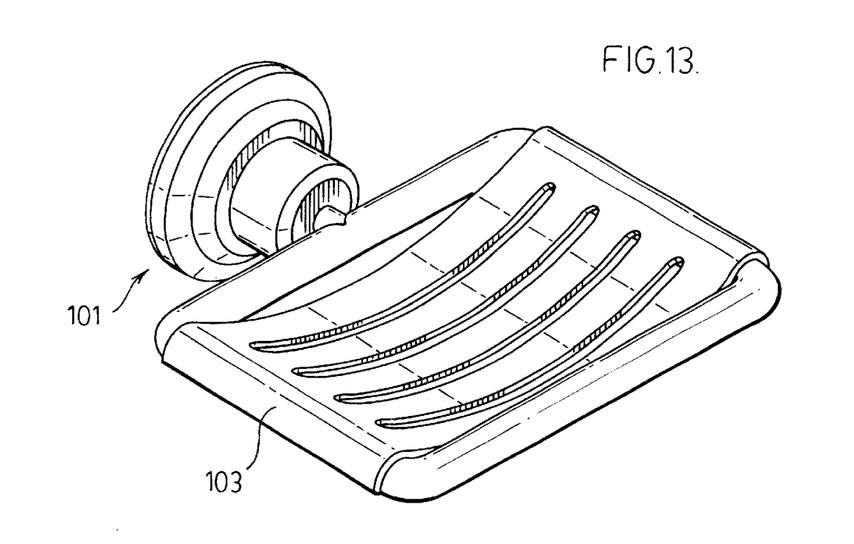

FIG. 13 shows a wall mountable assembly 101. The only difference between this assembly and any of the earlier described assemblies is that the product support part is in the form of a different shaped soap dish 103.

Figure 14:
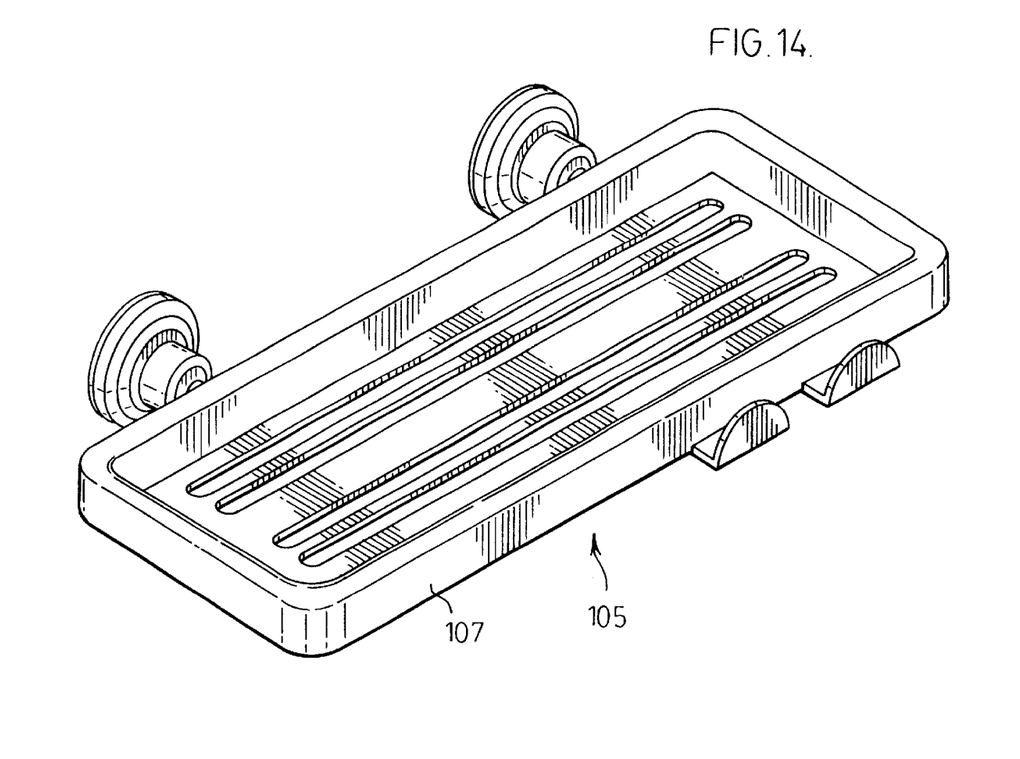

FIG. 14 shows a wall mountable assembly 105 which has a pair of base parts supporting yet a further style of soap dish 107.

Figures 15, 16:
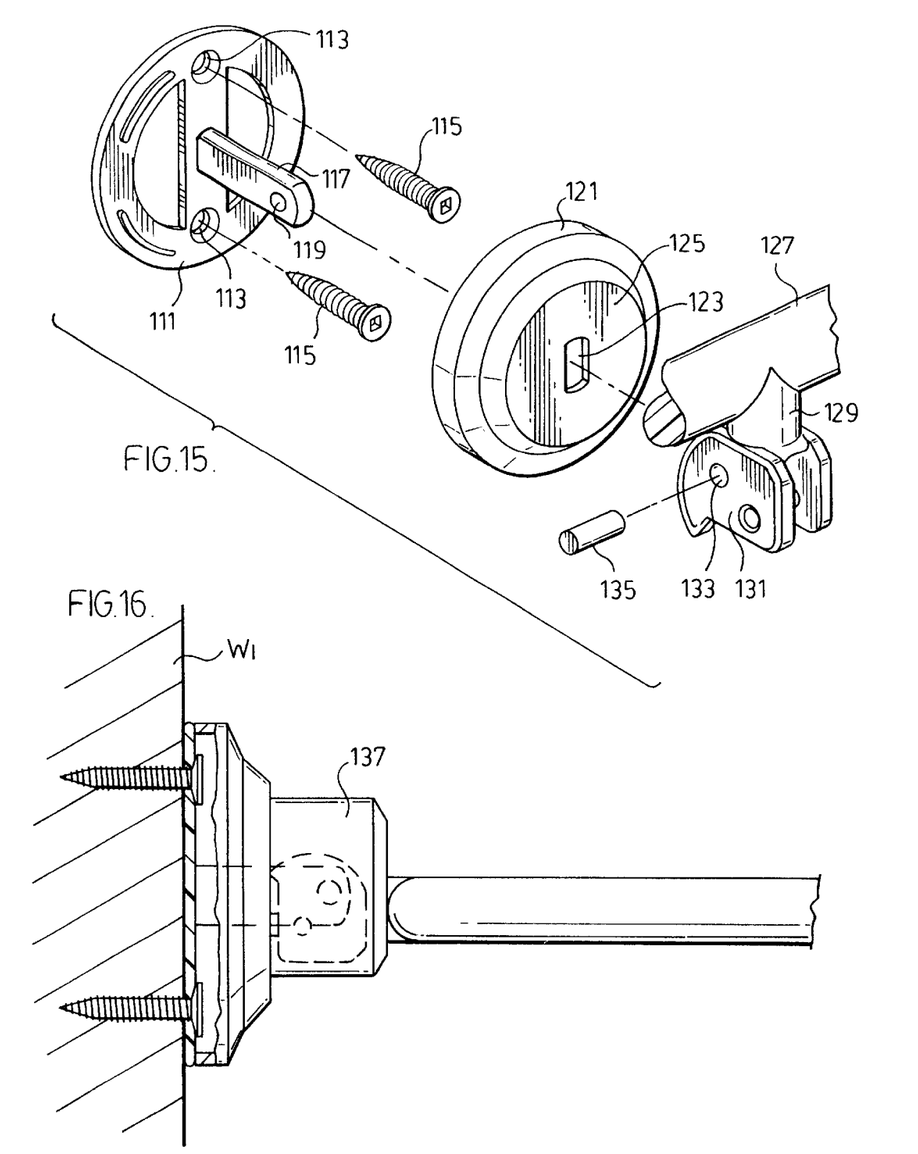
FIG. 15 is an exploded front perspective view of a base part of a wall mountable assembly according to yet a further preferred embodiment of the present invention.
FIG. 16 is a partially sectioned side view of the base part of FIG. 15 when assembled.

FIGS. 15 and 16 of the drawings show a variant of the invention. According to this variant the earlier described suction cup mount is replaced by a rigid wall mounting piece 111. This wall mounting piece includes mechanical fastener receiving openings 113. Mechanical fasteners in the form of screws 115 are used to secure piece 111 to a wall W1. In this case the wall will preferably have a wood, plaster or other fastener receiving construction.

Other than the replacement of the suction cup with the rigid fastener the assembly shown in FIG. 15 operates in the same manner as the earlier described assemblies.

More specifically, the wall mounting piece 111 includes an arm 117 that extends through an opening 123 of a decorative cover 121.

Piece 111 is first mounted to the wall and cover 121 is then fitted over piece 111.

The arm 117 which extends through opening 123 of he cover includes a small hole 119. This hole fits between the walls of a cam member 131 of an object support part 127 of the assembly. More specifically, each of the walls of the cam member 131 includes an opening 133 that aligns with the opening 119 in arm 117. A pin 135 then fits through all of the aligned openings to provide a pivotal connection of the cam member with the arm 117 of rigid piece 111.

The object support part 127 is connected to cam 131 by a small base leg 129 of the object support part. In the initial set-up the base leg 129 sits vertically as shown in FIG. 15. The object support part is then swung through a 90 degree angle rotating the cam 131 against the front surface 125 of decorative cover 121. This moves the base leg 129 of the object support part to the horizontally extending position of FIG. 16 where a decorative cap 137 fits over the cam member.

In this embodiment, the swinging motion of the object support part does not operate a suction cup but rather pushes on the decorative cover to tighten the overall assembly when the object support part is in its FIG. 16 use position.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A wall mountable assembly comprising a base part and an object support part extending from said base part, said base part comprising a wall attachment member and a cover member which fits over said wall attachment member, said wall attachment member having an arm which extends through a front face of said cover member, said object support part having a base leg and a cam member extending from said base leg to one end of said object support part, said cam member comprising a pair of spaced apart cam walls each of which has a rounded cam edge, said arm of said wall attachment member being secured by a pivot connection to said cam member between said cam walls, said object support part being swingable from a non use position ready to mount to a wall surface to a wall mounted use position relative to said base part which causes said cam member to move from a loose position to a tight position relative to said cover of said base part, said assembly further including a locking cap having a front surface, a back edge and a bottom side with a blind ended slot having a slot mouth opening through said bottom side of said cap and extending through said front face to said back edge of said cap, said slot being bordered by slot walls hidden interiorly of said cap, said slot walls releasably locking onto said cam walls such that said back edge of said cap is located against said front face of said cover member with said cap covering said cam member and lying over said base leg of said object support part blocking said object support part from moving away from the use position.

2. A wall mountable assembly as claimed in claim 1, wherein said base leg of said object support part swings from a vertically extending position to a horizontally extending position when said object support part is swung from the non use position to the use position.

3. A wall mountable assembly as claimed in claim 2, wherein the rounded cam edge of each of said cam walls faces said front face of said cover member when said. base leg of said object support part is in the vertically extending position.

4. A wall mountable assembly as claimed in claim 1 wherein said slot walls of said cap flex over and lock onto said cam walls.

5. A wall mountable assembly as claimed in claim 4 including a male to female snap interlock between said slot walls and said cam walls.

6. A wall mountable assembly as claimed in claim 5 wherein said slot walls are provided with inwardly directed projections which snap lock into openings in said cam walls.

7. A wall mountable assembly as claimed in claim 1 wherein said wall attachment member comprises a suction cup.

8. A wall mountable assembly as claimed in claim 1 wherein said wall attachment member comprises a rigid mechanical fastener receiving member.

* * * * *